J. M. WEYDELL.
STARTER GENERATOR CONNECTION.
APPLICATION FILED JAN. 27, 1917.
1,255,369.
Patented Feb. 5, 1918.
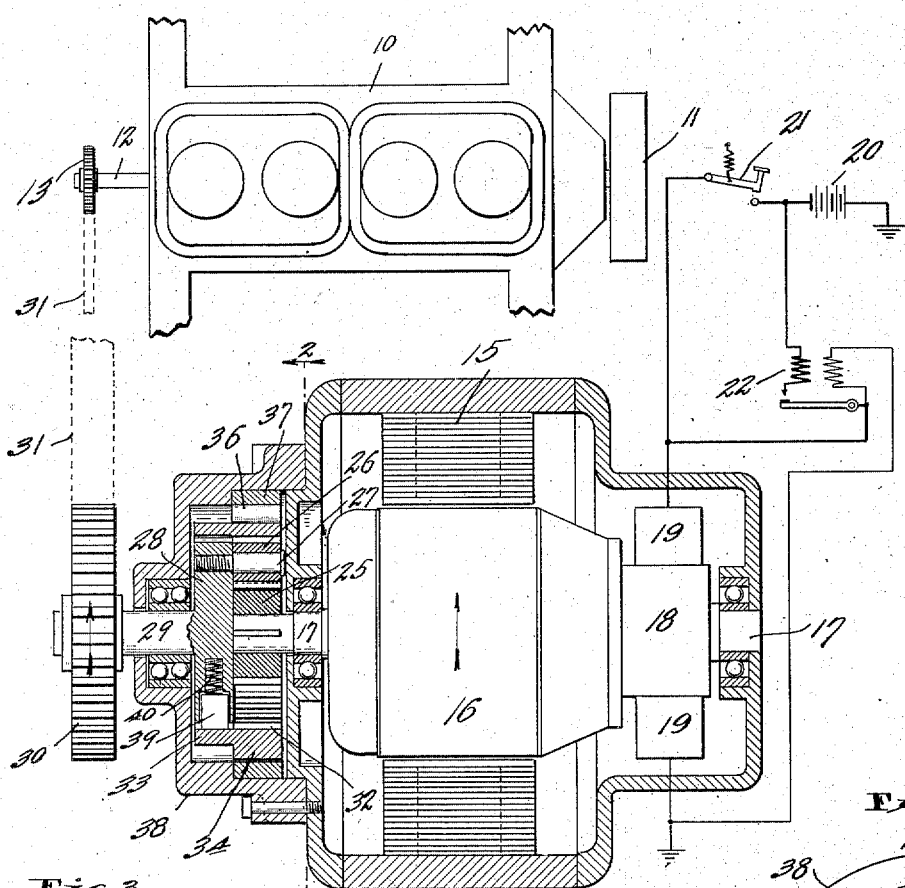
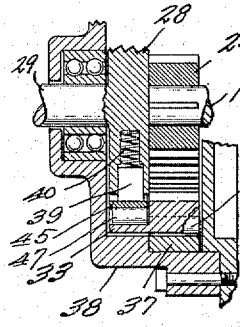
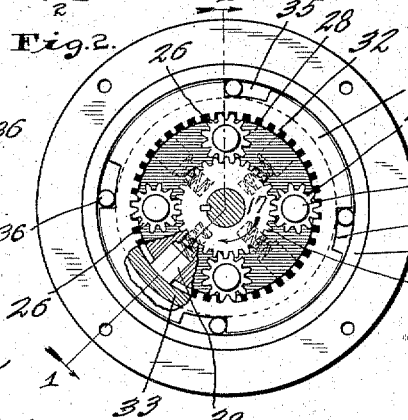
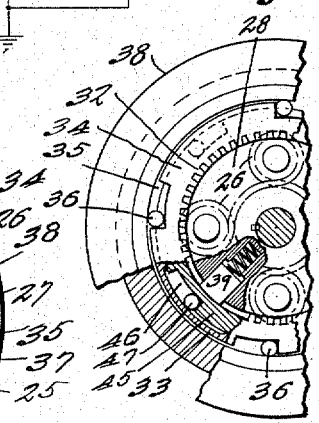
WITNESSES:
Frank A. Sahle
Josephine Gasper
INVENTOR
Jarl M. Weydell,
BY
Hood & Schley,
ATTORNEYS

UNITED STATES PATENT OFFICE.

JARL M. WEYDELL, OF INDIANAPOLIS, INDIANA.

STARTER-GENERATOR CONNECTION.

1,255,369.  Specification of Letters Patent.  Patented Feb. 5, 1918.

Application filed January 27, 1917. Serial No. 144,869.

*To all whom it may concern:*

Be it known that I, JARL M. WEYDELL, a subject of the King of Sweden, who has declared his intention of becoming a citizen of the United States, residing at Indianapolis, in the county of Marion and State of Indiana, have invented a new and useful Starter-Generator Connection, of which the following is a specification.

It is the object of my invention to provide a gearing between an internal combustion engine and a dyamo-electric machine, whereby with a single connection between the two one speed ratio may be obtained for supplying power to the internal combustion engine for starting it and another and variable speed ratio may be obtained for driving the dynamo-electric machine as a generator from the engine for charging the storage battery. By this arrangement, the same dynamo-electric machine may if desired be used economically and efficiently as a starter motor and as a charging generator.

The accompanying drawing illustrates my invention. Figure 1 is a semi-diagrammatic view showing the engine, the dynamo-electric machine, and the engine circuits diagrammatically, and a gearing in longitudinal section on the line 1—1 of Fig. 2; Fig. 2 is a section on the line 2—2 of Fig. 1, with a portion broken away to show one of the friction blocks of the friction connection and its mounting; and Figs. 3 and 4 are fragmentary views corresponding respectively to portions of Figs. 1 and 2, but showing a slightly modified construction.

An internal combustion engine 10 is shown diagrammatically, with the usual fly wheel 11 at one end of its crank shaft 12 and a sprocket 13 on the other end thereof. The dynamo-electric machine is of any suitable type, being illustrated diagrammatically as having a field magnet 15, an armature 16 mounted on a shaft 17, and a commutator 18 having the usual brushes 19. For using the dynamo-electric machine as a starter motor, it is connected directly across the battery 20 in the usual manner, as by depressing a foot switch 21; while when the dynamo-electric machine is being driven as a generator and its voltage rises above a predetermined minimum it is connected to charge the battery 20 by any usual electro-magnetic relay 22 arranged to connect and disconnect the generator and battery when the generator voltage rises above and falls below a predetermined value.

On the shaft 17 of the armature of the dynamo-electric machine is a sun gear 25, which meshes with a number of planet gears 26 mounted on pins 27 carried by a disk 28 on the end of a shaft 29 in alinement with the armature shaft 17. This shaft 29 carries a sprocket 30 which is connected to the sprocket 13 on the engine shaft 12 by a chain 31. A floating ring gear 32 meshes with the planet gears 26. This ring gear has an axial flange 33 which surrounds the disk 28, and a circumferential flange 34 in the plane of the sun and planet gears. The circumferential flange 34 is provided with a series of clutch notches 35 of different depths at their two ends, in which notches are mounted rollers 36 to form an overrunning clutch between the ring gear 32 and a stationary wear member 37 fixed in the frame 38 in which the gearing and dynamo-electric machine are mounted. The overrunning clutch formed between the flange 34 and the fixed member 37 by the rollers 36 in the notches 35 permits the ring gear 33 to rotate in a clockwise direction while preventing it from rotating in a counterclockwise direction (Fig. 2). A plurality of friction blocks 39 are mounted in the disk 28 and spring-pressed outward by springs 40 into engagement with the inner face of the axial flange 33, by their frictional engagement with such axial flange tending to lock the disk 28 and ring gear 32 against relative rotation.

In operation, when it is desired to start the engine 10, the foot switch 21 is closed to supply current from the battery 20 to the dynamo-electric machine, so that the latter acts as a motor and rotates in the direction of the arrow. The sun gear 25 rotates with the armature 16 of this starter motor. Because of the friction of the engine 10, there is a tendency to hold the disk 28 from moving, so that by reason of the rotation of the sun gear 25 in the direction of the arrow—clockwise in Fig. 2—a tendency is created to move the ring gear 32 in the other or counterclockwise direction. As soon as such counterclockwise movement of the ring gear 32 commences, however, the rollers 36 roll to the shallow ends of the notches 35 and lock such ring gear to the fixed member 37 so as to prevent it from rotating. Thereupon, because the ring gear 32 cannot rotate, the continued rotation of the armature 16 and the sun gear 25 produces rotation of the disk 28 and shaft 29 in the same direction but at a less speed. During this rotation of the disk 28 while the ring gear 32 remains stationary, the friction blocks 39 slide on the inner face of the axial flange 33; but this does not materially interfere with the operation at this time, because of the large mechanical advantage which the starter motor has by reason of the difference in speed between the shafts 17 and 29. The motion of the shaft 29 is transmitted through the sprockets 30 and 13 and chain 21 to the shaft 12 of the engine 10, thus starting the engine into operation. When the engine begins to operate under its own power, it immediately gains in speed, and drives the shaft 29 at a greater speed than it previously had, and by reason of the engagement of the frictional blocks 18 with the axial flange 33, the ring gear 32 is carried around with the shaft 29 and disk 28. At about the same time the foot switch 21 is allowed to open, and the armature 16 may slow down slightly until it is going no faster than the now accelerating shaft 29. Then the armature 16 is driven from the shaft 29 at substantially the same speed—exactly the same speed unless the friction blocks 39 slip; and as the engine gains in speed the armature 16 likewise gains in speed until the voltage developed thereby is sufficient to cause the closing of the electro-magnet relay 22 so that such armature acting as a generator supplies current to charge the battery 20. If the speed of the engine increases beyond a predetermined value, the resultant increase in load on the armature 16 causes slipping to occur between the friction blocks 39 and the axial flange 33 of the ring gear, whereby the armature 16 rotates at less speed, and its voltage and speed are thereby prevented from increasing unduly. The amount of such slipping increases as the engine speed increases, and ceases when the engine speed falls below a certain value.

In the construction just described, as stated, there is a slight loss of power during starting by reason of the slipping of the friction blocks 39 on the axial flange 33. This slight loss is eliminated in the arrangement shown in Figs. 3 and 4, where a floating ring 45 is mounted between the friction blocks 39 and the axial flange 33. The friction blocks 39 coöperate with this floating ring 45 in the same way as they do directly with the axial flange 33 in the arrangement shown in Figs. 1 and 2. The outer surface of the floating ring 45 is provided with notches 46 of different depths at their two ends, in the same way as are the notches 35, and in these notches 46 are mounted rollers 47 so as to form an overrunning clutch between the floating ring 45 and the ring gear 32 or its axial flange 33. This overrunning clutch formed between the floating ring 45 and the axial flange 33 permits the ring 45 to rotate relatively to the axial flange 33 in a clockwise direction, while preventing it from rotating relatively thereto in a counterclockwise direction. By this arrangement, when the dynamo-electric machine is operating as a starting motor to crank the engine, and the ring gear 32 and its axial flange 33 are held stationary by the overrunning clutch formed by the rollers 36 and notches 35, the other overrunning clutch, formed by the rollers 47 and notches 46, permits the floating ring 45 to turn with the disk 28 in a clockwise direction, without requiring any slipping of the friction blocks 39; while when the engine is driving the dynamo-electric machine as a generator, so that there is a tendency to drive the ring gear 32 in a clockwise direction at a greater speed than the armature 16, and therefore at a greater speed than the disk 28, so that there is a tendency for such ring gear and its axial flange 33 to rotate in a clockwise direction relative to the disk 28, the overrunning clutch formed by the rollers 47 and notches 46 locks the floating ring 45 to the axial flange 33 so that they rotate as one, and when a predetermined speed is exceeded slipping occurs between the friction blocks 39 and the inner surface of the floating ring 45 in the same way as already described for such friction blocks and the axial flange in the arrangement shown in Figs. 1 and 2.

I claim as my invention:

1. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and a slipping clutch between said floating ring gear and the member which carries the planet gears.

2. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and yieldable means tending to lock the parts of the planetary gearing thus formed so that they rotate as a unit.

3. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and a connection including an overrunning clutch between said ring gear and the member carrying said planet gears.

4. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and a connection including an overrunning clutch between parts of the planetary gearing thus formed.

5. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and a connection including both a slipping clutch and an overrunning clutch between said ring gear and the member which carries said planet gears.

6. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and a connection including both a slipping clutch and an overrunning clutch between two of the parts of the planetary gearing thus formed.

7. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and yieldable means tending to lock together said ring gear and the member which carries said planet gears.

8. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and a slipping clutch between two of the parts of the planetary gearing thus formed tending to lock the planetary gearing together to form a rotational unit, said slipping clutch having as high frictional pressure between its parts at low speeds as at high speeds.

9. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and a connection between said ring gear and the member which carries said planet gears, said connection including both an overrunning clutch and yieldable means permitting relative slipping when a predetermined load is exceeded.

10. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and a connection between two of the parts of the planetary gearing thus formed, said connection including both an overrunning clutch and yieldable means permitting relative slipping when a predetermined load is exceeded.

11. In combination, a dynamo-electric machine, a sun gear connected with the rotating member thereof, planet gears meshing with said sun gear, a member carrying said planet gears and arranged for connection to an internal combustion engine, a floating ring gear meshing with said planet gears, a stationary member, an overrunning clutch between said floating ring gear and said stationary member, and a slipping clutch between two of the parts of the planetary gearing thus formed tending to lock the planetary gearing together to form a rotational unit, said slipping clutch in its action being independent of speed.

12. In combination, a dynamo-electric machine, a member arranged for connection to an internal combustion engine, an epicyclic gearing connecting said dynamo-electric machine and said member to produce a speed reduction when power is supplied through said gearing to said member, an overrunning clutch holding one part of said epicyclic gearing against rotation in one direction, and a slipping clutch connecting two of the parts of said epicyclic gearing and tending to cause such gearing to rotate as a unit, but permitting relative slipping between such parts when in the normal driving of the dynamo-electric machine as a generator by torque from said member the torque developed exceeds a predetermined value, by such slipping limiting the voltage developed by said dynamo-electric machine, said slipping clutch having as high frictional pressure between its parts at low speeds as at high speeds.

13. In combination, a dynamo-electric machine, a member arranged for connection to an internal combustion engine, an epicyclic gearing connecting said dynamo-electric machine and said member to produce a speed reduction when power is supplied through said gearing to said member, an overrunning clutch holding one part of said epicyclic gearing against rotation in one direction, and a slipping clutch connecting two of the parts of said epicyclic gearing and tending to cause such gearing to rotate as a unit, but permitting relative slipping between such parts when in the normal driving of the dynamo-electric machine as a generator by torque from said member the torque developed exceeds a predetermined value, by such slipping limiting the voltage developed by said dynamo-electric machine, said slipping clutch in its action being independent of speed.

14. In combination, a dynamo-electric machine, a member arranged for connection to an internal combustion engine, an epicyclic gearing connecting said dynamo-electric machine and said member to produce a speed reduction when power is supplied through said gearing to said member, an overrunning clutch holding one part of said epicyclic gearing against rotation in one direction, and yieldable means tending to lock the parts of the epicyclic gearing together so that they rotate as a unit, but permitting relative slipping between such parts when in the normal driving of the dynamo-electric machine as a generator by torque from said member the torque developed exceeds a predetermined value, by such slipping limiting the voltage developed by said dynamo-electric machine.

In witness whereof, I have hereunto set my hand at Indianapolis, Indiana, this 18th day of January, A. D. one thousand nine hundred and seventeen.

JARL M. WEYDELL.